L. BACHO.
RECLEARER DEVICE.
APPLICATION FILED AUG. 25, 1916.
1,264,750.
Patented Apr. 30, 1918.
2 SHEETS—SHEET 1.
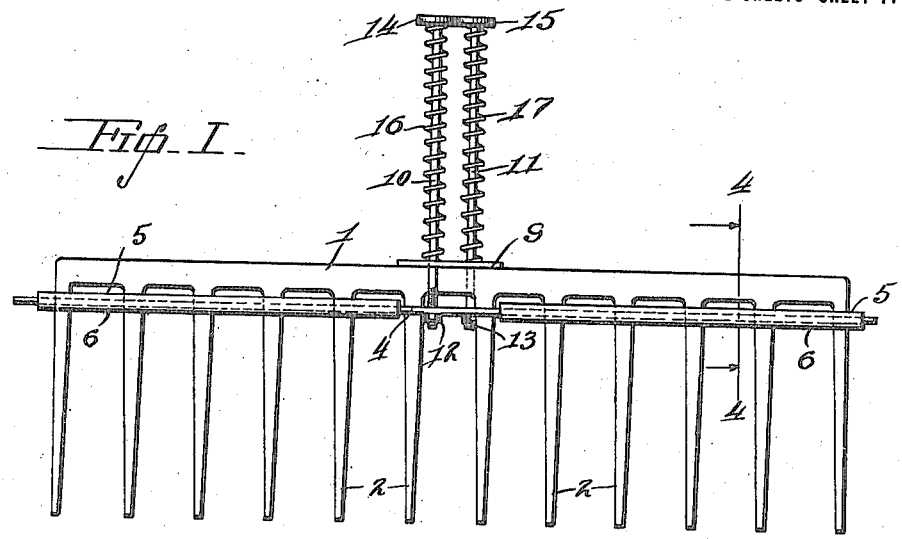
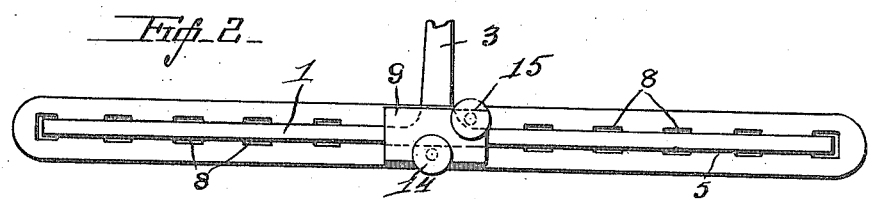
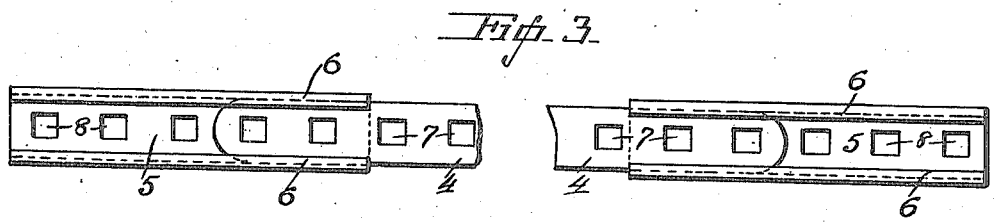
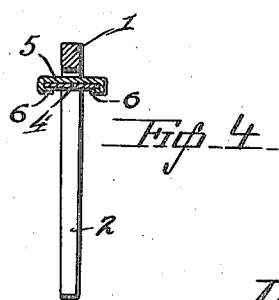
Witnesses
E. S. Hall.
C. H. Crawford.
Inventor
Louis Bacho
By Richard Bauer
Attorney L. BACHO.
RECLEARER DEVICE.
APPLICATION FILED AUG. 25, 1916.
1,264,750.
Patented Apr. 30, 1918.
2 SHEETS—SHEET 2.
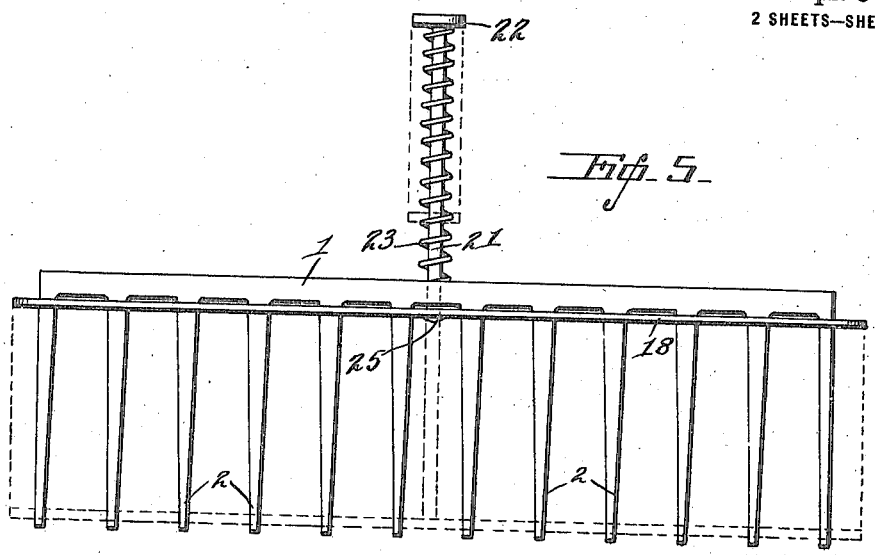
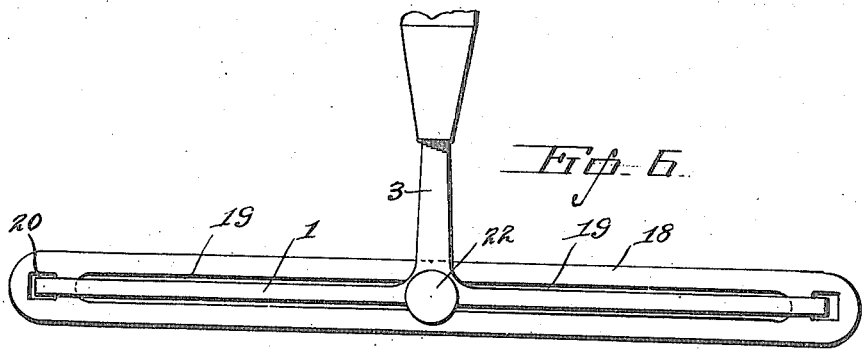
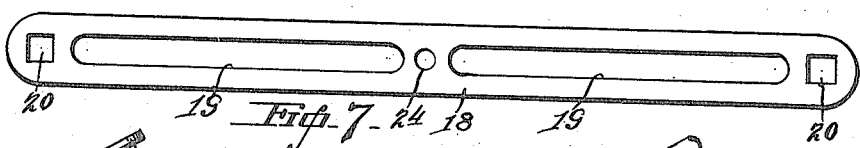
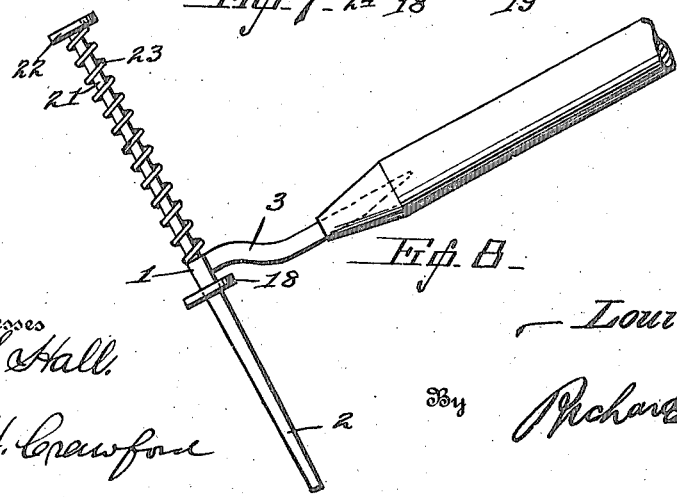
Witnesses
E. S. Hall.
C. H. Crawford
Inventor
Louis Bacho
By Richard Bewen,
Attorney

UNITED STATES PATENT OFFICE.

LOUIS BACHO, OF GREENVILLE, MISSISSIPPI.

RECLEARER DEVICE.

1,264,750.  Specification of Letters Patent.  Patented Apr. 30, 1918.

Application filed August 25, 1916. Serial No. 116,916.

*To all whom it may concern:*

Be it known that I, LOUIS BACHO, citizen of the United States, residing at Greenville, in the county of Washington and State of Mississippi, have invented certain new and useful Improvements in Reclearer Devices, of which the following is a specification.

The object of this invention is to provide an attachment for reclearing the teeth of tanged or toothed agricultural implements such as rakes, from clods or wedged accumulations.

A special feature of my invention consists in a rake reclearer comprising a strip which is movable along the teeth and in a direction parallel therewith.

A further object of my invention is to provide a clearer strip with openings for accommodating the teeth and mounted in such a manner that the teeth will guide the clearer strip in its movement therealong.

A further object of my invention is to provide an adjustable clearer strip for attachment to rakes of heads of different lengths.

Further objects and features of the invention will be more fully described in connection with the accompanying drawings and will be more particularly pointed out and ascertained in and by the appended claims.

In the drawings:—

Figure 1 is a front elevation of a rake head equipped with the preferred form of the device of my invention.

Fig. 2 is a plan view thereof.

Fig. 3 is a plan view of the adjustable form of clearer, detached from the rake.

Fig. 4 is a sectional view on line 4—4 of Fig. 1.

Fig. 5 is a front view of a rake equipped with a modified form of my invention.

Fig. 6 is a plan view thereof.

Fig. 7 is a plan view of the clearer detached from the rake.

Fig. 8 is an end view of the rake head and handle showing the device of my invention in place thereon.

Like characters of reference designate similar parts throughout the different figures of the drawings.

As illustrated, and referring more particularly to Figs. 1 to 4, inclusive, 1 designates a rake head provided with teeth 2. A handle shank 3 is shown extending from the head, rearwardly, for attachment of a handle.

My improved attachment includes an extensible clearing strip which is shown as composed of a central section 4 and end sections 5. The end sections 5 are provided with downwardly turned margins 6 which form guides in which the central section 4 is slidable. The central and outer sections are provided with openings 7 and 8, respectively, which are shaped and spaced to accommodate the teeth 2 for movement of the clearing strip along the teeth. By reason of the fact that the clearing strip structure is extensible and contractible, the same may be fitted to rakes of different sizes, in a manner which will now be clear.

I secure to the top of the rake head 1 a guiding plate 9 through which guiding stems 10 and 11 extend. The lower ends of the stems 10 and 11 are secured to the central section 4 by means such as nuts 12 and 13 and the upper ends of the stems are provided with heads 14 and 15. Springs 16 and 17 are interposed between the guiding plate 9 and the heads 14 and 15 so as to normally hold the clearing strip in the position shown in Fig. 1. By striking the stem heads 14 and 15, on the ground, with rake up side down the clearing strip will be moved along the teeth and in the direction of their length so as to clear the same from clods or aggregations of material wedged therebetween, the springs serving to retract the clearing strip to a normal position when pressure is released from the heads 14 and 15. I preferably enlarge the openings 7 and 8 with respect to the cross-section of the teeth so that the strip will move freely therealong, reliance being placed upon the stems 10 and 11 to guide the strip. However, should the material clogging the rake be disposed on the end teeth, the apertures in the strip structure would guide the same against movement out of a normal position with respect to the teeth.

In view of the fact that each section is provided with openings for accommodating the teeth, no means is required to hold the extensible strip structure in any position that it may be adjusted, as the teeth themselves perform this function.

In the form shown in Figs. 5 to 8, the clearing strip 18 is provided with elongated openings 19 for accommodating all of the teeth excepting the endmost teeth of the head. Openings 20 serve to accommodate the endmost teeth and act to prevent longitudinal or lateral movement of the clearing strip. In this form of the invention I provide a single operating stem 21, having a head 22, between which and the rake head 1 is interposed a spring 23. The stem 21 may be secured to the clearing strip 18 by means of an aperture 24 in which the lower end of the stem 21 may be riveted, as indicated at 25.

The operation of this form of my invention is practically the same as that described in connection with the preferred form and the stem 21 moves parallel with the teeth and is guided in the head structure, instead of by a separate guiding plate.

By reason of the fact that the clearing strips move along the teeth and are actuated by a stem which is guided to move parallel with the teeth, I not only avoid objectionable hinge constructions but I provide a more positively acting device for shifting clods and other clogging material off from the teeth.

It is believed that the advantages and utility of my invention will be clearly understood from the foregoing description and while I have herein shown and described one specific form of my invention, in its utility in connection with a hand rake, its utility in connection with any form of tanged or toothed agricultural implements will be a mere matter of mechanical adaptation and therefore I do not wish to be limited thereto except for such limitations as the claims may import.

I claim:—

1. In a reclearer device, a head provided with teeth, and clearing means for the teeth comprising a central section, and end sections slidably connected with the central section, all of said sections having openings for accommodating the teeth for movement of said structure therealong.

2. A reclearer device for use in conjunction with a tool having a head provided with teeth, comprising a central section provided with openings to receive certain of the teeth of the tool, means by which said central section is mounted in conjunction with the head to be capable of movement along the length of the teeth, and end sections adjustably and slidably connected with said central section and provided with tooth receiving openings.

3. In a reclearer device, a head provided with teeth, a clearing strip structure comprising a central section and end sections slidably connected with the central section and all of said sections having openings to accommodate the teeth, and means guided by the head and connected with the central section for operating said strip structure, substantially as described.

4. In a reclearer device, a head provided with teeth, a clearing strip structure comprising a central section and end sections slidably and adjustably connected with the central section, all of said sections being provided with openings to accommodate the teeth of the head, means guided by the head and connected with the central section for operating said strip structure, and springs connected with the operating means by which force is exerted against the strip structure to draw the same along the length of the teeth to be normally disposed adjacent to the head.

In testimony whereof I affix my signature in presence of two witnesses.

LOUIS BACHO.

Witnesses:
 CHRIS. METCALF,
 J. B. GILLIAM.